SUPERCONDUCTIVE ALLOYS

Original Filed Feb. 21, 1967

United States Patent Office 3,671,226
Patented June 20, 1972

3,671,226

SUPERCONDUCTIVE ALLOYS

Toranosuke Komata, Katsumi Ishihara, and Yasuo Hashimoto, Amagasaki, Japan, assignors to Mitsubishi Denki Kabushiki Kaisha, Tokyo, Japan Continuation of application Ser. No. 617,681, Feb. 21, 1967. This application Apr. 22, 1969, Ser. No. 818,453
Claims priority, application Japan, Feb. 28, 1966, 41/11,687
Int. Cl. H01f *7/22;* C22c *15/00*
U.S. Cl. 75—175.5 4 Claims

ABSTRACT OF THE DISCLOSURE

The disclosed superconductive alloys comprise essentially, by atomic percent, from 20 to 80% of titanium, from 1 to 80% tantalum and from 2 to 80% of niobium. They are excellent in workability and have the magnetic field-to-critical supercurrent density characteristics substantially identical to the supercurrent-to-critical magnetic field characteristics. In addition they do not exhibit the training effect and have a relatively high critical temperature.

Figure 1:
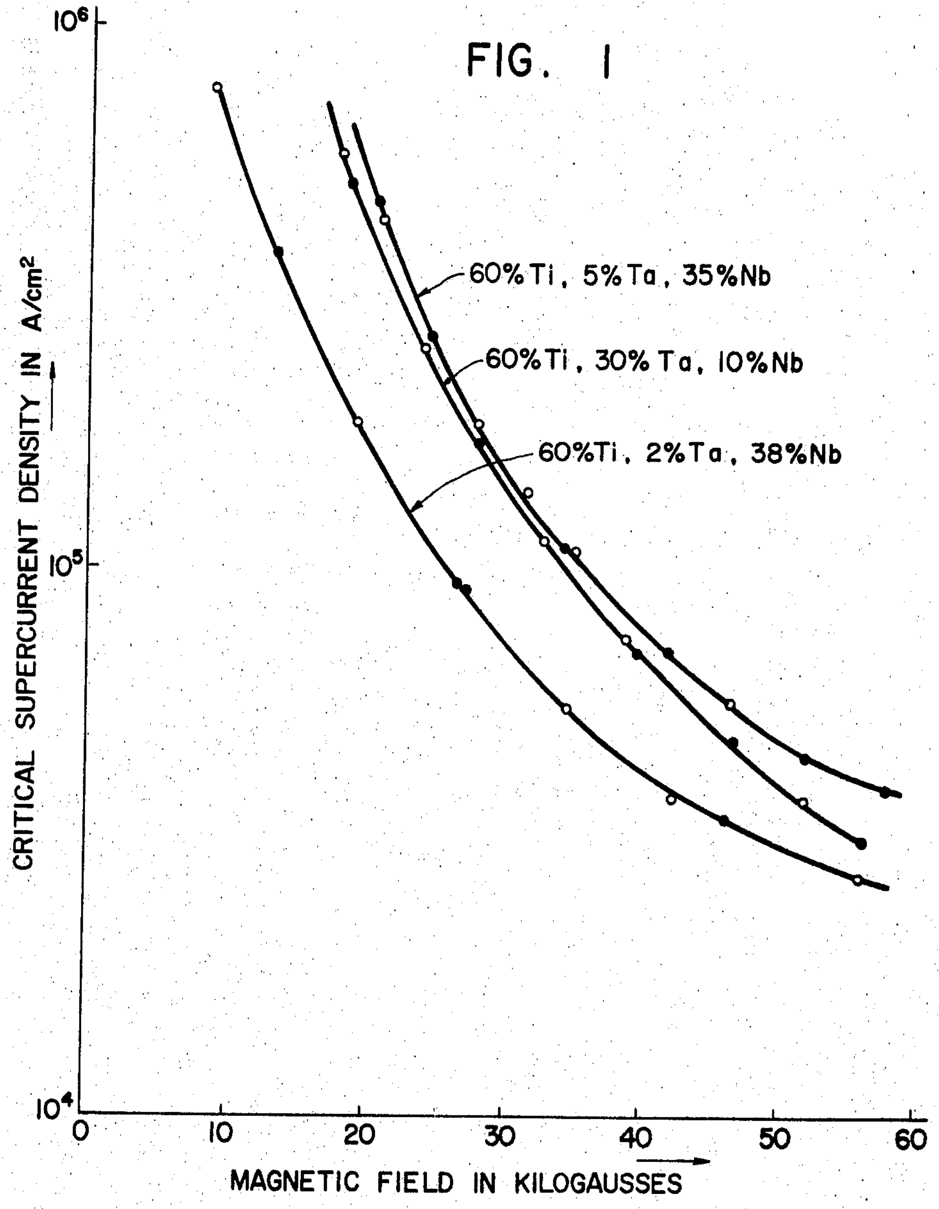

This invention relates to ternary superconductive alloys consisting essentially of titanium, tantalum and niobium and is a continuation of application Ser. No. 617,681, filed Feb. 21, 1967 and now abandoned.

The phenomenon of superconductivity whereby certain metals, alloys and compounds thereof lose their normal resistances to the flows of electrical current at extremely low or cryogenic temperatures is well known. Also it is known that one type of the most interesting devices utilizing the phenomenon of superconductivity is the electromagnet. Examples of superconductive materials for superconductive wires or strips for use with the electromagnets involve superconductive alloys such as niobium-zirconium alloys and niobium-titanium alloys, and superconductive compounds such as triniobium-tin ($Nb_3Sn$). Such a compound as $Nb_3Sn$ is a superconductive material capable of withstanding the application of a very high magnetic field but is difficult to shape this material into the form of a wire, or a strip according to the conventional metallurgical processes because of its very high brittleness. For this reason the formation of wires or strips from the superconductive compound $Nb_3Sn$ can be carried out only with special complicated processes various difficult problems are encountered.

Therefore, at present, there is great interest in superconductive materials of alloy type excellent in frageability, workability and mechanical properties even though such materials might be inferior in superconductive characteristics to the $Nb_3Sn$ compound. The binary niobium-zirconium alloys developed superconductive materials have a "critical magnetic field or $H_c$ relatively low as approximately 90 kilogausses" which field is the maximum magnetic field in which the superconductor can operate. Also the niobium-zirconium alloys have their "critical supercurrent density" or $J_c$ suddenly decreased upon reaching a region of high magnetic fields. If the critical supercurrent density is exceeded the conductor will lose its superconductive properties and become "normal." For example, it has been determined that in a magnetic field in the order of 50 kilogausses a short length of a certain superconductive wire had the critical supercurrent density of $3\times10^4$ amperes which is not high. Further the known niobium-zirconium alloys have several disadvantages such as the difficulty of shaping them into thin wires or strips.

Further niobium-titanium alloys are already known as being superconductive materials. These alloys are greatly superior to the above mentioned niobium-zirconium alloys in terms of the critical supercurrent density $J_c$, the critical field $H_c$ and the workability with which they can be worked into thin wires or strips. On the other hand, the niobium-titanium alloys have external field-to-critical supercurrent density characteristics not consistently identical to their supercurrent-to-critical field characteristics. The external field-to-critical supercurrent density characteristics represent the relationship between an externally applied magnetic field and the critical supercurrent density for a flow of supercurrent through the conductor after the external magnetic field has been applied thereto and may be called the "H–$J_c$" characteristics hereinafter. The supercurrent-to-critical field characteristics represent the relationship between the critical field $H_c$ measured with a constant supercurrent flowing through the conductor and the supercurrent flowing at that time through the latter and may be called the "J–$H_c$" characteristics hereinafter. Therefore if niobium-titanium alloy wires are used to produce electromagnets, the latter exhibit a phenomenon that the permissible supercurrent capacity is decayed leading to one of great defects in designs and applications.

The niobium-titanium alloys have another disadvantage in that their H–$J_c$ and J–$H_c$ characteristics have a training effect. The term "training effect" means that if a current flows through a short length of superconductive Nb–Ti conductor or a superconductive coil for an electromagnet in its maiden state a low value of such a current causes it to lose its superconductive properties whereas if that conductor or coil loss in superconductive properties is repeated several times subjection of such a conductor or coil to treatment wherein it is sufficiently cooled in liquid helium followed by a flow of current, the permissible supercurrent gradually increases up to a maximum value which is constant. The niobium-zirconium alloys in certain special conditions may exhibit the training effect just described which present a large trouble to the process of exciting the associated superconductive electromagnet.

lowed by a flow of current, the permissible supercurrent gradually increases up to a maximum value which is constant. The niobium-zirconium alloys in certain special conditions may exhibit the training effect just described which presents al arge trouble to the process of exciting the associated superconductive electromagnet.

Firstly, the process of exciting a superconductive electromagnet becomes complicated and secondly the associated coil is frequently heated as a result of its superconductive properties being repeatedly lost. This may cause the superconductive wire forming the coil to change its metallurgical properties greatly to deteriorate its characteristics. In the extreme case, the generated heat causes faults such as break of the coil. Thirdly, the generation of heat caused from the loss of the superconductive properties leads to consumption of a large amount of liquid helium due to its vaporization. For the above reasons the training effect is a great obstacle to the production and use of superconductive electromagnets.

The conventional niobium-titanium alloys have an additional disadvantage that the magnetic fields produced at the cryogenic temperatures by electromagnets utilizing wires of such alloys are unstable at their low values. More specifically, if a superconductive magnetic field is established by an electromagnet including an electromagnetic coil made of one of such niobium-titanium alloys reaches its magnitude in the order of 20 kilogausses, the coil greatly decreases its permissible supercurrent capacity and again increases to its higher value in the generated magnetic field of 30 kilogausses or more. In order to compensate for the unstable property of the magnetic field at its low value established by the electromagnets utilizing the superconductive niobium-titanium alloy wire or strip, it is required to add to that magnetic field an external magnetic field in excess of 30 kilogausses established by an additioned electromagnet including an electromagnetic coil made of a superconductive alloy such as a niobuim-zirconium alloy having substantially no unstable property of the low magnetic field. This leads to a great disadvantage that it is impossible to use singly the wires of niobium-titanium alloys to produce electromagnets.

Accordingly, a general object of the invention is to eliminate the disadvantages as above described.

An object of the invention is to provide new and improved superconductive alloys having such a high workability that the alloys as cast can readily be worked into wires or strips by the conventional cold working processes.

These and other objects that will be apparent as the following description proceeds are attained by provision of a ternary superconductive alloy comprising, by atomic percent, from 20 to 80% of titanium, from 1 to 80% of tantalum and from 2 to 80% of niobium except for trace amounts of incident impurities.

Figure 2:
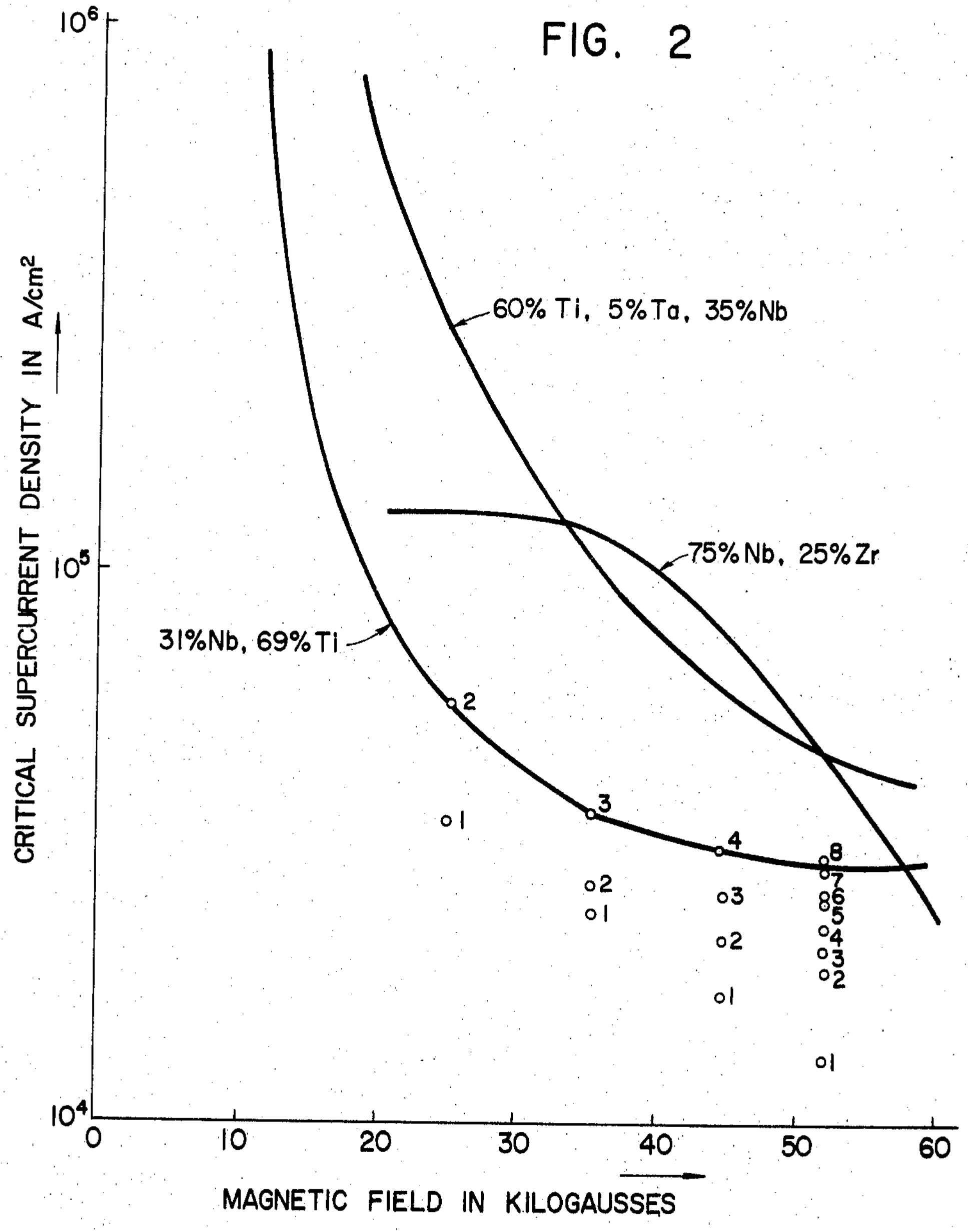

The invention will become more readily apparent from the following detailed description taken in conjunction with the accompanying drawing in which:

FIG. 1 is a graph illustrating the critical supercurrent density-to-critical magnetic field characteristics exhibited by short lengths of wire made of superconductive titanium-tantalum-niobium alloys according to the invention; and FIG. 2 is a graph illustrating the critical supercurrent density-to-critical magnetic field characteristics of the superconductive titanium-tantalum-niobium alloys according to the invention as compared with those of the conventional niobium-titanium and niobium-zirconium alloys.

The invention comprises a ternary superconductive alloy comprising, by atomic percent, from 20 to 80% of titanium, from 1 to 80% of tantalum and from 2 to 80% of niobium. Such an alloy may contain trace amounts of incident impurities.

The present alloys yield nearly ideal materials from the standpoint of production and provide substantially perfect solid solutions. Thus the alloys as cast are excellent in cold workability such that they can readily be worked into wires or strips by the conventional metallurgical cold working processes. In other words, they can be cold reduced to a reduction of area of at least 99% to be made into thin wires or strips without any intermediate heat treatment. This reduction of area is far superior to the known superconductive niobium-zirconium and niobium-titanium alloys. The high cold workability is one of the characteristic features of the present alloys and exhibits an additional advantage that the current capacities of conductors composed of the alloys can increase.

Another characteristic feature of the invention is to provide the superconductive alloys having the H–$J_c$ characteristics substantially identical to the J–$H_c$ characteristics. Therefore any electromagnet including an electromagnetic coil composed of the present Ti-Ta-Nb alloy wire or strip exhibits no decay of the permissible supercurrent capacity and hence has extremely preferable properties.

Still another characteristic feature of the invention is to provide the superconductive alloy not exhibiting the training effect as previously described. Therefore the superconductive electromagnets incorporating the invention are substantially free from the obstruction that might be encountered in their excitation.

It is noted that an electromagnetic coil composed of a length of the superconductive titanium-tantalum-niobium alloy wire or strip does not have the unstable property of the low magnetic field produced thereby. This allows a superconductive electromagnet to be produced by utilizing the present ternary alloy alone without the necessity of providing auxiliary means for applying an external magnetic field to the electromagnet.

Further the wires or strips of the superconductive ternary alloys according to the invention are very high in permissible supercurrent capacity or critical supercurrent density as compared to those made of the other known superconductive alloys. For example, the critical supercurrent density could have at least its value of $5 \times 10^4$ amperes per $cm.^2$ in the magnetic field or 5 kilogausses at a temperature of 4.2° Kelvin. The value of the critical supercurrent density may increase by any suitable treatment. Thus it will be appreciated that the present alloys have the very high critical magnetic fields as well as the greatly promising characteristic features.

The superconductive titanium-tantalum-niobium alloy may be produced by any suitable known process. For example, the metals, titanium, tantalum and niobium are melted in an atmosphere of an inert gas or a vacuum by any of various known processes such as the consumable electrode-arc melting, non-consumable electrode-arc melting or electron beam melting process. The resulting ingot may be subjected to hot and cold working or cold working alone to be formed into wires, strips or any other shapes in accordance with the particular applications. If desired, intermediate heat treatment or treatments or final heat treatment may be utilized to improve the properties of the products.

The following example illustrates the practice of the invention.

EXAMPLE

A weighed charge of metals, titanium, tantalum and niobium was melted repeatedly several times by the non-consumable electrode-arc melting process to provide a homogeneous alloy. The resulting ingot was subjected to cold swaging and cold drawing to be worked into a thin wire having a diameter of 0.25 mm. after which the wires was subject to the final heat treatment at 400° C. for one hour. The cold swaging and drawing caused the ingot to be reduced to a reduction of area of at least 99%. The process was repeated for various compositions of titanium, tantalum and niobium.

The resulting wires were measured in terms of the superconductive properties or the H–$J_c$ characteristics, the J–$H_c$ characteristics, the critical supercurrent density etc. and of the metallurgical properties. The methods of measurement are well known in the art and need not be described here.

Examples of the results of measurements are illustrated in FIGS. 1 and 2. The proportions of the elements are given by atomic percent unless otherwise stated.

FIG. 1 illustrates the magnitudes of the J–$H_c$ and H–$J_c$ characteristics of 60% Ti—2% Ta—38% Nb, 60% Ti—5% Ta—35% Nb and 60% Ti—30% Ta—10% Nb alloys measured at 4.2° Kelvin with the magnetic field applied substantially perpendicularly to the longitudinal axis of each sample, a short length of single wire. In FIG. 1 the mark "white circle" designates the H–$J_c$ characteristics and the mark "black circle" designates the J–$H_c$ characteristics.

As clearly seen in FIG. 1, the Ti–Ta–Nb alloys according to the invention do not have any difference at all between the H–$J_c$ and J–$H_c$ characteristics which offers a proof that the invention provides excellent superconductive materials different in properties from the conventional Nb–Ti alloys.

FIG. 2 illustrates a comparison of 60% Ti—5% Ta—35% Nb alloy of the invention with the known 31% Nb—69% Ti and 75% Nb—25% Zr alloys in terms of the H–$J_c$ characteristics and the training effect exhibited by a short length of each sample. The data for the Ti–Ta–Nb and Nb–Ti alloys were those actually measured by the applicants while the data for Nb–Zr alloy were obtained from H. T. Coffey et al. article in Journal of Applied Physics, vol. 36, No. 1 (1965), pages 128–136. The mark "white circle" designating the H–$J_c$ characteristics of the Nb–Ti alloy and the reference numerals denoted adjacent the mark indicate a variation in permissible supercurrent density measured in an applied magnetic field due to the number of measurements. More specifically, the white circles designated by the reference numerals 1, 2, 3, . . . represent the magnitudes of permissible supercurrent density measured in the first, second, third, . . . measurements respectively. As can be seen in FIG. 2, the Nb–Ti alloy reached a constant maximum magnitude after several repeated measurements. In other words, the Nb–Ti alloys exhibit the great training effect. It is said that the Nb–Zr alloys have the more or less training effect that is not great as compared with the Nb–Ti alloys.

On the contrary, the Ti–Ta–Nb alloys of the invention exhibit no training effect as can be seen in FIG. 2. This indicates that the present alloys are quite different in properties from the known Nb–Ti alloys.

As can be also seen in FIG. 2, the Nb–Zr alloys illustrated have the respective critical supercurrent densities fairly high in the lower magnetic fields but suddenly decreased in the higher magnetic field and inferior to that of the Nb–Ti alloy. However, it will be seen that the Ti–Ta–Nb alloy is superior in critical supercurrent density to each of the Nb–Ti and Nb–Zr alloys.

Further it has been found that the present alloys have the relatively high critical temperatures $T_c$ or transition temperatures at which the superconductive materials lose their superconductive conditions. For example, 69% Ti—5% Ta—35% Nb alloy according to the invention has the critical temperature $T_c$ in the order of 10.7° Kelvin which is higher than 9.8° Kelvin for 31% Nb—69% Ti alloy and approximates 11° Kelvin for 75% Nb—25% Zr alloy.

From the foregoing it will be appreciated that the objects of the invention have been accomplished by the provision of ternary superconductive alloys comprising, by atomic percent, from 20 to 80% of titanium, from 1 to 80% of tantalum and from 2 to 80% of niobium. These alloys are far superior in workability to the conventional superconductive alloys. This superior workability cooperates with the easy production of the alloys to greatly contribute to the economy.

While the invention has been described with reference to several embodiments thereof it is to be understood that it falls in the scope of the invention to alloy to the present alloys as previously described any other material or materials including a superconductive solid solution or solutions and/or a superconductive compound or compounds in order to change the properties of the final product or products.

What we claim and desire to be secured by Letters Patent is:

1. A method of generating a magnetic field which comprises providing a superconductive alloy consisting of by atomic percent 20 to 80% of titanium, 1 to 80% of tantalum and 6 to 80% of niobium except for trace amounts of incident impurities, cooling said alloys to a temperature at which said alloy becomes superconductive and flowing an electric current through said alloy.

2. In a superconducting magnetic field generating device containing at least a conductor comprising a superconductive alloy the improvement wherein said superconductor consists of by atomic percent from 20 to 80% of titanium, from 1 to 80% of tantalum, from 2 to 80% of niobium except for trace amounts of incident impurities.

3. A method according to claim 2 in which said alloy is cooled to a temperature at least as low as about 11° K.

4. In an electromagnet having at least one coil made of an alloy having at least one coil made of an alloy having superconductivity below its critical temperature the alloy consisting of by atomic percent from 20 to 80% of titanium, from 1 to 80% of tantalum, from 2 to 80% of niobium except for trace amounts of incident impurities.

References Cited

UNITED STATES PATENTS

| | | | |
|---|---|---|---|
| 2,964,399 | 12/1960 | Lyons. | |
| 3,038,798 | 6/1962 | Barger et al. | |
| 3,161,503 | 12/1964 | Lanning et al. | |
| 3,215,569 | 11/1965 | Kneip et al. | |
| 3,266,950 | 8/1966 | Zwicker. | |
| 3,303,065 | 2/1967 | Reynolds | 75—174 X |
| 3,408,604 | 10/1968 | Doi et al. | 75—174 X |

OTHER REFERENCES

Auslegeschrift, German Pub. 1,237,786, 1967.

Journal of Applied Physics, vol. 33, 1962, p. 2394.

Journal of Applied Physics, vol. 38, 1967, p. 903 and 904.

CHARLES N. LOVELL, Primary Examiner

U.S. Cl. X.R.

75—134, 174; 335—216